United States Patent

Middleton

[15] 3,683,009
[45] Aug. 8, 1972

[54] α, β-BIS(TRIFLUOROMETHYL) STILBENES

[72] Inventor: William J. Middleton, Wilmington, Del.

[73] Assignee: E. I. du Pont de Nemours and Company, Wilmington, Del.

[22] Filed: Oct. 10, 1968

[21] Appl. No.: 766,631

[52] U.S. Cl. ...260/479 R, 260/247.7 C, 260/293.83, 260/326.5 M, 260/408, 260/469, 260/468 R, 260/476 C, 260/570.7, 260/612 R, 260/613 A, 260/619 B, 260/649 F, 260/650 F, 424/248, 424/267, 424/274

[51] Int. Cl. .....................C07c 69/16, C07c 39/24

[58] Field of Search...260/479 R, 476 R, 619 B, 408, 260/469, 468 R

[56] References Cited

OTHER PUBLICATIONS

Chem. Abstracts, 68:38917w and 68:75464s

*Primary Examiner*—James A. Patten
*Attorney*—James H. Ryan

[57] ABSTRACT

Described and claimed are
1. the α,β-bis(trifluoromethyl)stilbenes of the formula

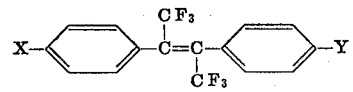

wherein X and Y, which may be the same or different, are H, OR or

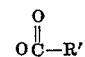

R being hydrogen, alkyl, hydroxyalkyl, dialkylaminoalkyl (including morpholinoalkyl, piperidinoalkyl and pyrrolidinoalkyl) R' being alkyl, cycloalkyl, cycloalkenyl, or aryl hydrocarbon group, the total carbon content of each R and R' not exceeding 12 carbon atoms;
2. pharmaceutical compositions of the aforementioned α,β-bis(trifluoromethyl)stilbenes; and
3. the use of the compounds and compositions of this invention as antifertility agents.

7 Claims, No Drawings

α,β-BIS(TRIFLUOROMETHYL) STILBENES

BACKGROUND OF THE INVENTION

1. Field of the Invention

This invention relates to α,β-bis(trifluoromethyl)-stilbene and to substitution products thereof wherein the para-position of at least one of the benzenoid rings bears an oxy group. This invention further relates to the use of said compounds as anti-fertility agents.

2. Description of the Prior Art

The following references from the chemical literature, none of which discloses the compounds of the present invention, are of general interest in the stilbene art:

a. Grundy, Chem. Rev., 57, 281 (1957).

This review article on the artificial estrogens discusses a number of substituted stilbenes, none of which contains fluorine.

b. Dixon, J. Org. Chem., 21, 400 (1956); U. S. Pat. No. 2,374,166 to DuPont.

These references report the reactions of phenyllithium with fluoroolefins including tetrafluoroethylene, perfluoropropylene and perfluorocyclolbutene. Reaction with perfluorobutene-2 is not disclosed. Included among the specific compounds prepared are the following:

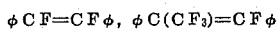
and
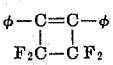

c. Andreades, J. Am. Chem. Soc., 84, 864 (1962).

This reference describes the reaction of phenyllithium with perfluorobutene-2 to give cis-and trans-2-phenylheptafluoro-2-butene. No mention of any diphenyl derivatives is made.

SUMMARY AND DETAILS OF THE INVENTION

At present there are widely used as antifertility agents compositions which act to establish a pseudopregnant condition in the female thus preventing ovulation. In general these compositions are mixtures of estrogens and progestins which are orally administered daily during a major portion of the menstrual cycle. Unfortunately the administration of such mixtures of estrogens and progestins can result in side effects similar to those commonly occurring during early pregnancy.

In contrast to the estrogen-progestin mixtures which must be taken in regular cycles for extended periods before coitus, the compounds of this invention are effective antifertility agents when administered after coitus. It is probable that the mechanism of their action is such that nidation is prevented. Among the practical advantages afforded by use of the compounds of this invention as antifertility agents are ease of administration and elimination of the adverse side effects of pseudopregnancy.

The novel compounds of this invention are α,β-bis-(trifluoromethyl)stilbenes [alternatively named trans-2,3-diphenylhexafluoro-2-butenes]]having the formula

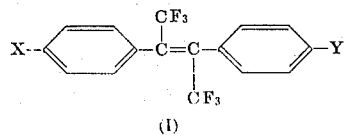

(I)

wherein X and Y, which may be the same or different, or H, OR or

R being hydrogen, alkyl, hydroxyalkyl, dialkylaminoalkyl (including morpholinoalkyl, piperidinoalkyl and pyrrolidinoalkyl) R' being alkyl, cycloalkyl, cycloalkenyl, or aryl hydrocarbon group, the total carbon content of each R and R' not exceeding 12 carbon atoms. The preferred compounds of this invention are those having oxygen attached to the para position of at least one of the benzene rings of the α,β-bis(trifluoromethyl)stilbene nucleus, i.e., compounds of the formula

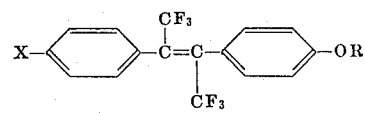

wherein X and R are defined as above. Particularly preferred are those compounds wherein X and Y are hydroxy, alkoxy of a lower (1–3 carbon) alkyl group and acyloxy of a 1–3 carbon carboxylic acid.

The stilbenes of this invention in which X and Y are alike and are H or O-alkyl can be prepared by the reaction of one equivalent of perfluorobutene-2 with two equivalents of phenyllithium or a p-alkoxyphenyllithium. The stilbenes in which X and Y are different and are H or O-alkyl can be prepared by the reaction of one equivalent of perfluorobutene-2 with one equivalent each of phenyllithium and p-alkoxyphenyllithium in sequential fashion or one equivalent each of two different p-alkoxyphenyllithiums in sequential fashion. These reactions are conducted in the presence of an inert solvent such as diethyl ether or a hydrocarbon such as hexane, benzene, etc. Neither pressure or temperature is critical. The optimum temperature is between −80° and +40° C., and the optimum pressure is between ½ and 3 atmosphere with atmospheric pressure being the most convenient to employ. The products of the reaction can be isolated and purified by conventional techniques such as distillation, recrystallization, and chromatography.

Stilbenes in which one or both of the X and Y groups are OH can be prepared by heating the corresponding alkoxystilbenes with concentrated hydroiodic acid. The stilbenes in which X and/or Y are acyloxy can be prepared by heating the corresponding hydroxystilbenes with acyl anhydrides or acyl halides.

An alternative route for preparing the alkoxystilbenes is by alkylation of the hydroxy stilbenes with alkylating agents such as alkyl sulfates or alkyl halides in the presence of an acid-acceptor such as sodium carbonate.

EMBODIMENTS OF THE INVENTION

The following nonlimiting examples illustrate in detail the preparation of various of the compounds of the present invention. The temperatures and pressures unless otherwise specified are in °C. and millimeters of mercury.

EXAMPLE 1

α,β-Bis(trifluoromethyl)stilbene

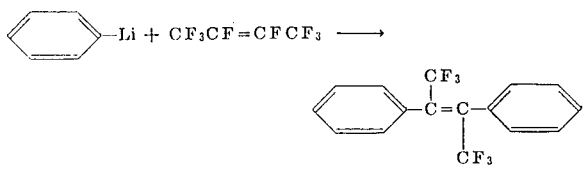

40 grams of perfluorobutene-2 (0.2 mole) were slowly distilled into 200 ml. of a solution containing 0.38 mole of phenyllithium dissolved in 75:25 ether-benzene cooled in an ice bath. The rate of addition was adjusted so that the temperature remained between 25°–40. After the addition was complete, the reaction mixture was poured into 1 liter of aqueous 5 percent hydrochloric acid. The organic layer was separated, washed with water and dried over $MgSO_4$. Evaporation of the solvents at reduced pressure gave a semisolid that was suspended in pentane. The undissolved solid was collected on a filter and then recrystallized from pentane to give 14.1 g. of $\alpha,\beta$-bis(trifluoromethyl)stilbene as colorless crystals; m.p. 179°–181°; uv (ethanol) $\lambda_{max}$ 241 m$\mu$ ($\epsilon$ 6,320); $F^{19}$ nmr ($CCl_3F$) $\delta$ 58.5 ppm from $CCl_3F$ (singlet).

Anal. Calcd. for $C_{16}H_{10}F_6$: C, 60.76; H, 3.19; F, 36.05.

Found: C, 61.19; H, 3.21; F, 35.98.

The pentane filtrate was distilled to give 5.0 g of a semi-solid fraction, b.p. 70°–80° (0.25 mm), that contained both the stilbene and the isomeric isostilbene (cis) compound. Pure fractions of both components were isolated by preparative gas chromatography on a fluorosilicone column. Two grams of $\alpha,\beta$-bis(trifluoromethyl)isostilbene were obtained as a colorless solid: m.p. 60°–62°; uv (ethanol) $\lambda_{max}$ 250 m$\mu$ ($\delta$ 4,230); $F^{19}$ nmr ($CCl_3F$) $\delta$ 58.5 ppm (singlet).

Anal. Calcd. for $C_{16}H_{10}F_6$: C, 60.76; H, 3.21; F, 36.05.

Found: C, 60.92; H, 3.28; F, 36.58.

EXAMPLE 2 p,p'-Dimethoxy-$\alpha,\beta$-bis(trifluoromethyl)stilbene

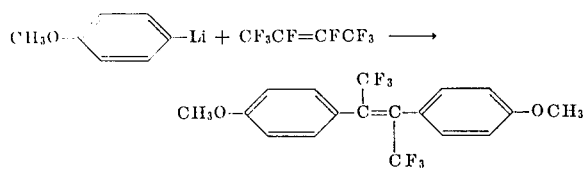

20 grams of perfluorobutene-2 (0.1 mole) were slowly distilled into an ethereal solution of 0.25 mole of p-methoxyphenyllithium (prepared from 3.5 g. of lithium and 47.0 g. of p-bromoanisole in 300 ml. of ether) cooled to −10° to 0°. After the addition was completed, 200 ml. of aqueous 5 percent hydrochloric acid was added, and the organic layer was separated, washed with water and dried over $MgSO_4$. The ether was removed by evaporation at reduced pressure, and the solid residue was fractionally recrystallized from ethanol to give two products.

p,p'-Dimethoxy $\alpha,\beta$-bis(trifluoromethyl)stilbene (8.0 g.) was obtained as the less-soluble product: colorless needles; m.p. 177°–178°, uv (ethanol). $\lambda_{max}$ 273 m$\mu$ ($\epsilon$ 8,200) and 223 m$\mu$ ($\epsilon$ 24,000); $F^{19}$ nmr (acetone) $\delta$ 57.9 ppm (singlet).

Anal. Calcd. for $C_{18}H_{14}F_6O_2$: C, 57.45; H, 3.75; F, 30.30.

Found: C, 57.56; H, 3.89; F, 30.25 p,p'-dimethoxy-$\alpha,\beta$-bis(trifluoromethyl)isostilbene (the cis isomer) (1.5 g.) was obtained as the more-soluble product: m.p. 99°–101°; $F^{19}$ nmr ($CCl_3R$) $\delta$ 58.4 ppm (singlet).

Anal. Calcd. for $C_{18}H_{14}F_6O_2$: C, 57.45; H, 3.75; F, 30.30

Found: C, 57.47; H, 3.91; F, 30.51

EXAMPLE 3 p,p'-Diethoxy-$\alpha,\beta$-bis(trifluoromethyl)stilbene

This compound was prepared in the manner of example 2, except that p-bromophenetole was used in place of p-bromoanisole. The stilbene was obtained as colorless crystals from pentane: m.p. 173°–175°; uv (ethanol)$\lambda_{max}$ 275 m$\mu$ ($\epsilon$ 8300), 224 m$\mu$ ($\epsilon$ 25,700); $F^{19}$ nmr ($CCl_3F$) $\delta$ 58.0 ppm (singlet).

Anal. Calcd. for $C_{20}H_{18}F_6O$: C, 59.41; H, 4.49; F, 28.19

Found: C, 59.77; H, 4.69; F, 28.24

EXAMPLE 4 p,p'-dihydroxy-$\alpha,\beta$-bis(trifluoromethyl)stilbene $$CH_3O-\langle\rangle-\underset{CF_3}{\overset{CF_3}{C=C}}-\langle\rangle-OCH_3 \xrightarrow{HI}$$

$$HO-\langle\rangle-\underset{CF_3}{\overset{CF_3}{C=C}}-\langle\rangle-OH$$

A mixture of 100 ml. of 58 percent aqueous hydroiodic acid and 5.0 g. p,p'-dimethoxy-$\alpha,\beta$-bis(trifluoromethyl)stilbene was stirred and heated at reflux for 40 hours. The reaction mixture was then cooled and poured into 200 ml. of water. The suspended solid was collected in a filter, washed with water and then dissolved in 300 ml. of an aqueous 5 percent sodium hydroxide solution. This solution was filtered to remove undissolved solid, and the filtrate was acidified with 10 percent hydrochloric acid. The resulting precipitate was collected on a filter, washed with water and recrystallized from ether-toluene to give 4.16 g. of p,p'-dihydroxy-$\alpha,\beta$-bis(trifluoromethyl)stilbene as a colorless solid: m.p. 265°–267°; ir (KBr) 2.97 $\mu$ (OH); uv (ethanol) $\lambda_{max}$ 278 m$\mu$ ($\epsilon$ 7,900), 223 m$\mu$ ($\epsilon$ 22,300); $F^{19}$ nmr (acetone) $\delta$ 58.1 ppm (singlet).

Anal. Calcd. for $C_{16}H_{10}F_6O_2$: C, 55.18; H, 2.90; F, 32.74

Found: C, 54.87; H, 3.08; F, 33.81

EXAMPLE 5 p,p'-diacetoxy-$\alpha,\beta$-bis(trifluoromethyl)stilbene $$HO-\langle\rangle-\underset{CF_3}{\overset{CF_3}{C=C}}-\langle\rangle-OH + (CH_3CO)_2O \longrightarrow$$

$$CH_3\overset{O}{\overset{\|}{C}}O-\langle\rangle-\underset{CF_3}{\overset{CF_3}{C=C}}-\langle\rangle-O\overset{O}{\overset{\|}{C}}CH_3$$

A solution of 1.74 g. of p,p'-dihydroxy-$\alpha,\beta$-bis(trifluoromethyl)stilbene in 25 ml. of acetic anhydride was heated at reflux for 1 hour, and then water (100 ml.) was added to destroy the excess anhydride. The solid that precipitated was collected on a filter, washed with water and recrystallized from benzene to give 1.51 g. of the diacetate as colorless crystals: m.p. 210°–212°; ir (KBr) 5.69 μ (C = O); uv (ethanol)λ$_{max}$ 245 mμ (ε 7,800); F$^{19}$ nmr (acetone) δ 57.7 (singlet).

Anal. Calcd. for $C_{20}H_{14}F_6O_4$: C, 55.56; H, 3.26; F, 26.37
Found: C, 55.61; H, 3.50; F, 27.78

EXAMPLE 6

A. β-fluoro-α,β-bis(trifluoromethyl)styrene

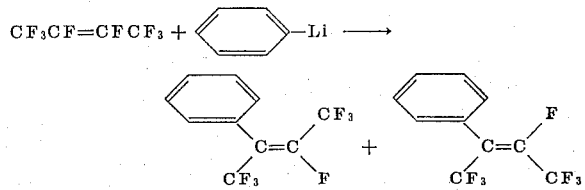

100 milliliters of a solution containing 0.2 mole of phenyllithium in 75:25 benzene/ether was added dropwise over a period of 1 hour to a stirred solution of 100 ml. (measured at −78°) of perfluorobutene-2 in 400 ml. of ether cooled to 0°. Aqueous 10 percent hydrochloric acid (200 ml.) was then added, and the organic layer was separated, washed with water and dried over MgSO$_4$. Distillation gave 21.1 g. of the styrene as a colorless oil, b.p. 60°–67° (40 mm). Gas chromatographic analysis (fluorosilicone column) indicated that this sample contained two isomers in approximately equal amounts.

Anal. Calcd. for $C_{10}H_5F_7$: C, 46.53; H, 1.95; F, 51.52
Found (mixture of 2 isomers) : C, 46.72; H, 1.99; F, 51.61

Samples of both isomers were separated by preparative gas chromatography on a fluorosilicone column. The CF$_3$, CF$_3$-trans isomer was obtained as a colorless oil: b.p. 60°–61° (40 mm); n$_D$$^{25}$ 1.3990; ir (liquid) 5.88 μ (C = CF); uv (ethanol) λ$_{max}$ 233 mμ (ε 3,300); F$^{19}$ nmr (CCl$_3$F) δ 63.4 ppm (doublet, J = 25 Hz split to quartets, J = 2 Hz, α-CF$_3$), 66.6 ppm (doublet, J = 7 Hz split to quartets, J = 2 Hz, β-CF$_3$), and 115.6 ppm (quartet, J = 25 Hz to quartets, J = 7 Hz, =CF).

The CF$_3$, CF$_3$-cis isomer was obtained as a colorless liquid: b.p. 67°–68° (40 mm); n$_D$$^{25}$ 1.4060; ir (liquid) 5.91 μ (C = CF); uv (ethanol)λ$_{max}$ 236 mμ (ε 4,000); F$^{19}$ nmr (CCl$_3$F) δ 58.1 ppm (doublet, J = 12 Hz to quartets, J = 12 Hz, α-CF$_3$) 66.9 ppm (quartet, J = 12 Hz to doublets, J = 8 Hz, β-CF$_3$), and 112.3 ppm (multiplet, =CF).

B. p-methoxy-α,β-bis(trifluoromethyl)stilbene

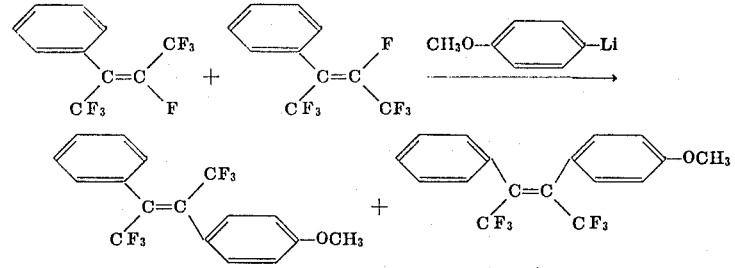

38 milliliters of a solution of 0.06 mole of butyllithium in hexane was mixed with 100. ml. of ether, and the resulting solution was cooled to 0°. 13 grams of p-bromoanisole (0.07 mole) were added dropwise over a period of 15 min., and the reaction mixture was then warmed to 25° and stirred for 1 hour. A solution of 12.9 g. (0.05 mole) of β-fluoro-α,β-bis(trifluoromethyl)styrene (mixture of isomers) in 10 ml. of ether was then added dropwise over a period of 30 min. with slight cooling to keep the temperature between 25°–30°. Aqueous 10 percent hydrochloric acid (100 ml.) was then added, and the organic layer was separated, washed with water, dried over MgSO$_4$ and distilled. There was obtained 11.05 g. of a colorless liquid, b.p. 110°–120° (0.15 mm), that partially solidified upon cooling. The F$^{19}$ nmr spectrum in CCl$_3$F indicated two isomeric stilbenes in approximately equal amounts: 58.3 ppm and 58.7 ppm (quartets, J = 1.8 Hz, CF$_3$, CF$_3$-trans) and 59.2 (A$_3$B$_3$ pattern, CF$_3$, CF$_3$- cis.). Two successive recrystallizations from pentane of a 3-g. portion boiling at 110°–113° (0.15 mm) (the fraction richest in the trans isomer) gave 1.7 g. of the pure isomer, p-methoxy-α,β-bis(trifluoromethyl)-stilbene, as colorless crystals: m.p. 94°–96°; F$^{19}$ nmr (CCl$_3$F) δ 58.3 ppm (quartet, J = 1.8 Hz) and δ 58.7 ppm (quartet, J = 1.8 Hz) uv (ethanol) λ$_{max}$ 265 mμ (ε 4,950) and 222 mμ (ε 15,300).

Anal. Calcd. for $C_{17}H_{12}F_6O$: C, 58.96; H, 3.50; F, 32.92
Found: C, 58.91; H, 3.58; F, 33.23

EXAMPLE 7 p-hydroxy-α,β-bis(trifluoromethyl)stilbene

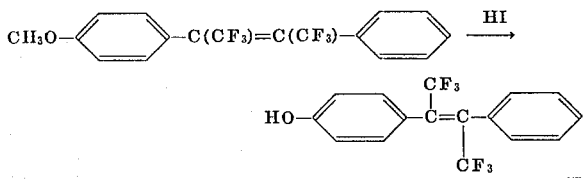

A mixture of 40 ml. of 58 percent aqueous hydroiodic acid and 5.0 g. of p-methoxy-α,β-bis(trifluoromethyl)stilbene (mixture of cis and trans isomers) was heated at reflux for 20 hours and then cooled. The solid portion of the reaction mixture was collected on a filter, washed with water and then dissolved in 200 ml. of warm 2 percent sodium hydroxide solution. The resulting solution was filtered to remove undissolved material, and the filtrate was acidified with 10 percent hydrochloric acid. The white precipitate that formed was collected on a filter, washed with water and then recrystallized from benzene to give 2.1 g. of p-hydroxy-α,β-bis(trifluoromethyl)stilbene as colorless crystals: m.p. 190°–192°; uv (ethanol) λ$_{max}$ 270 mμ (ε 4,600) 222 mμ (ε 16,000); ir (KBr) (OH); F$^{19}$ nmr (acetone) δ 57.7 ppm (quartet, J = 1.8 Hz) and 58.1 ppm (quartet, J = 1.8 Hz).

Anal. Calcd. for $C_{16}H_{10}F_6O$: C, 57.84; H, 3.03; F, 34.32
Found: C, 57.93; H, 3.23; F, 34.43

EXAMPLE 8 p-acetoxy-α,β-bis(trifluoromethyl)stilbene

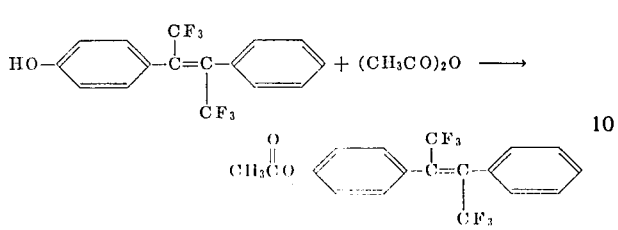

A solution of 500 mg. of p-hydroxy-α,β-bis(trifluoromethyl)stilbene in 15 ml. of acetic anhydride was heated at reflux for 30 min. Water (50 ml.) was added to decompose the excess anhydride. The solid that precipitated was collected on a filter, washed with water and then recrystallized from hexane to give 500 mg. of p-acetoxy-α,β-bis(trifluoromethyl)-stilbene as colorless prisms: m.p. 140°–142°; ir (KBr) $\mu$ (C = O); uv (ethanol) $\lambda_{max}$ 245 m$\mu$ ($\epsilon$ 6,060); $F^{19}$ nmr (acetone) $\delta$ 57.7 ppm (m, $A_3B_3$).

Anal. Calcd. for $C_{18}H_{12}F_6O_2$: C, 57.76; H, 3.23; F, 30.46
Found: C, 57.81; H, 3.53; F, 30.33

EXAMPLE 9 p,p'-dihydroxy-α,β-bis(trifluoromethyl)stilbene

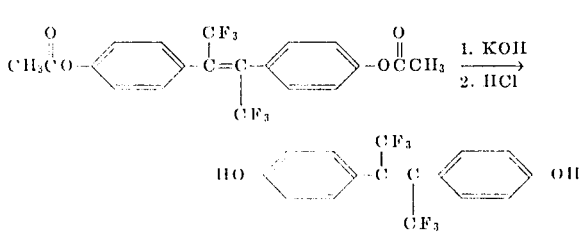

A mixture of 6.5 g. (0.015 mole) of p,p'-diacetoxy-α,β-bis(trifluoromethyl)stilbene (see example 5) and 6.5 g. of potassium hydroxide in 100 ml. of ethanol was stirred and heated at reflux for 1 hour and then cooled and diluted with 200 ml. of water. The resulting solution was acidified with aqueous 10 percent hydrochloric acid, and the white solid that precipitated was collected on a filter, washed with water, dried in air and then recrystallized from ether-toluene. There was obtained 4.34 g. (83 percent yield) of p,p'-dihydroxy-α,β-bis(trifluoromethyl)stilbene as colorless crystals: m.p. 269°–270°; $F^{19}$ nmr (acetone) $\delta$ 58.1 ppm (singlet).

Anal. Calcd. for $C_{16}H_{10}F_6O_2$: C, 55.18; H, 2.90; F, 32.74
Found: C, 55.22; H, 3.16; F, 32.62

EXAMPLE 10 p,p'-dipropionoxy-α,β-bis(trifluoromethyl)stilbene

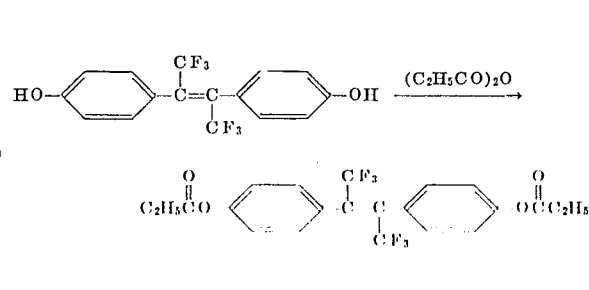

A solution of 1.74 g. (0.005 mole) of p,p'-dihydroxy-α,β-bis(trifluoromethyl)stilbene in 25 ml. of propionic anhydride was heated at reflux for 1 hour, and then 100 ml. of water was added to decompose the excess anhydride. The white solid that precipitated was collected on a filter, washed with water, dried in air and then recrystallized from heptane. There was obtained 1.39 g. (60 percent yield) of long colorless needles: m.p. 179°–181°; H' nmr (acetone-d6) $\tau$ 2.58 ($A_2B_2$, 8H) $\tau$ 7.35 (quartet, J = 7 Hz, 2CH$_2$); $\tau$ 8.80 (triplet, J = 7 Hz, 2CH$_3$); $F^{19}$ nmr (acetone-d6) $\delta$ 57.8 ppm (singlet).

Anal. Calcd. for $C_{22}H_{18}F_6O_4$: C, 57.39; H, 3.95; F, 24.76
Found: C, 57.57; H, 4.10; F, 24.81

EXAMPLE 11 p,p'-dihydroxy-α,β-bis(trifluoromethyl)stilbene dibenzoate

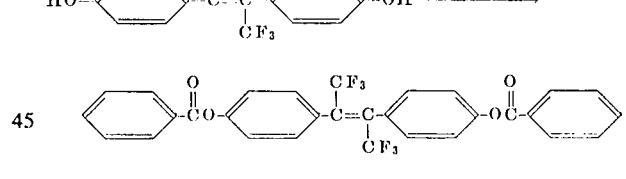

A mixture of 1.74 g. (0.005 mole) of p,p'-dihydroxy-α,β-bis(trifluoromethyl)stilbene and 25 ml. of benzoyl chloride was heated at 170° for 1 hour, at which time the evolution of HCl ceased. The reaction mixture was cooled and diluted with 100 ml. of pentane. The solid that formed was collected on a filter, washed with pentane and recrystallized from benzene to give 1.68 g. (63 percent yield) of the dibenzoate as colorless crystals: m.p. 274°–276°; $F^{19}$ nmr (acetone) $\delta$ 57.8 ppm (singlet).

Anal. Calcd. for $C_{30}H_{18}F_6O_4$: C, 64.75; H, 3.26; F, 20.49
Found: C, 64.85; H, 3.33; F, 20.39

In addition to the stilbenes whose preparation is detailed in the foregoing examples, the stilbenes listed in table I which follows can be prepared by one or more procedures previously illustrated.

TABLE I

The compounds of this invention can be administered to prevent pregnancy in warm-blooded animals according to the method of this invention by any suitable means. Oral administration is preferred. Administration also can be parenteral, that is subcutaneous or intramuscular, or rectal. Compounds of this invention are preferably administered in a single dose, preferably orally, after coitus. Alternatively, single or divided doses can be administered daily during all or a substantial fraction of the estrous cycle or menstrual cycle.

Doses may range from about 0.0005 to about 50 milligrams per kilogram of body weight of the recipient per day (mg./kg.-day), with from about 0.0025 to about 10 mg./kg.-day and from about 0.005 to about 5 mg./kg.-day generally preferred.

The compounds of this invention can also be employed with equally satisfactory results to prevent pregnancy in laboratory animals such as rats, mice, guinea pigs, rabbits, monkeys and chimpanzees and are also effective in preventing pregnancy in domestic animals such as swine, cows, sheep and horses. In small animals it is usually convenient to administer the compounds of this invention in the form of a capsule or to incorporate them in the feed of the animal. However, when these compounds are administered to large animals, it is often more convenient to administer them parenterally.

The compounds of this invention can be employed in useful compositions according to the present invention in such dosage forms as tablets, capsules, powder packets or liquid solutions, suspensions or elixirs for oral administration; liquid solutions for parenteral use; and in certain cases, suspensions for parenteral use. In such compositions the active ingredient will ordinarily always be present in the amount of at least 0.01 percent by weight based on the total weight of the composition and not more than 90 percent by weight.

Besides the active ingredient of this invention, the composition will contain a solid or liquid non-toxic pharmaceutical carrier for the active ingredient.

In one embodiment of a pharmaceutical composition of this invention, the solid carrier is a capsule which can be of the ordinary gelatin type. The capsule will contain from about 0.03-75 percent by weight of a compound of this invention and 99.97-25 percent of a carrier.

In another embodiment, the active ingredient is tableted with or without adjuvants. In yet another embodiment, the active ingredient is put into powder packets and employed. These capsules, tablets, and powders will generally constitute from about 0.03 to about 95 percent and preferably from 0.1 to 70 percent by weight of active ingredient. These dosage forms preferably contain from about 0.1 to about 700 milligrams of active ingredient, with from about 0.3 milligram to about 350 milligrams most preferred.

The pharmaceutical carrier can, as previously indicated, be a sterile liquid such as water and oils, including those of petroleum, animal, vegetable or synthetic origin, for example, peanut oil, soybean oil, mineral oil, sesame oil and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.0035 to 25 percent, and preferably about 0.01 to 5 percent by weight of the active ingredient.

As mentioned above, oral administration can be in a suitable suspension, syrup or elixir in which the active ingredient ordinarily will constitute from about 0.0007 to 5 percent and preferably about 0.003 to 1 percent by weight. The pharmaceutical carrier in such composition can be an aqueous vehicle such as an aromatic water, a syrup or a pharmaceutical mucilage.

Suitable pharmaceutical carriers are described in "Remington' Pharmaceutical Sciences" by E. W. Martin, a well-known reference text in this field.

THe following examples further illustrate use of the compounds of the present invention. The cis isomers have substantially lower activity.

EXAMPLE A

Immature female rats (28 days old) are induced into precocious puberty with a single dose of pregnant mare's serum gonadotrophin and then are mated with normal males. $\alpha,\beta$-bis-(trifluoromethyl)stilbene [see example I] suspended in sesame oil is orally administered in graded doses to numerically equal groups of these female rats for 6 days starting on the day of finding sperm or a vaginal plug. 1 week after mating, the animals are killed and their uteri are examined for implantation sites. If any are found, the animal is considered pregnant. Control animals have a mean of eight implantation sites. The dose level at which 50 percent of the animals show no evidence of pregnancy, the $ED_{50}$, is between 0.078 and 0.31 mg./kg.-day.

The general procedure of the preceding example is repeated with other bis(trifluoromethyl)stilbenes. table II which follows summarizes these experiments.

TABLE II

| Example | Compound of Example | $ED_{50}$ in mg./kg.-day |
| --- | --- | --- |
| B | 2 | 0.0012 – 0.0049 |
| C | 3 | 0.020 |
| D | 4,9 | 0.0012 – 0.0049 |
| E | 5 | 0.0012 – 0.0049 |
| F | 6 | 0.02 – 0.078 |
| G | 7 | 0.02 – 0.078 |
| H | 8 | 0.02 – 0.078 |

The embodiments of the invention in which an exclusive property or privilege is claimed are defined as follows:

1. An $\alpha,\beta$-bis(trifluoromethyl)stilbene of the formula

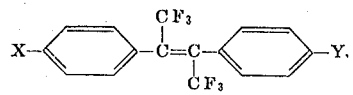

wherein X and Y, which may be the same or different, are selected from the group H, OH or

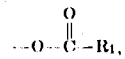

$R^1$ being alkyl, cycloalkyl, cycloalkenyl or aryl hydrocarbon, the total carbon content of $R^1$ being no more than 12 carbon atoms, with the proviso that only one of X and Y can be hydrogen.

2. The compound of claim 1 wherein X = Y = OH, p,p'-dihydroxy-$\alpha,\beta$-bis(trifluoromethyl)stilbene.

3. The compound of claim 1 wherein X = Y =

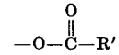

wherein R' is $CH_3$, p,p'-diacetoxy-$\alpha,\beta$-bis(trifluoromethyl)stilbene.

4. The compound of claim 1 wherein X = H and Y = OH, p-hydroxy-$\alpha,\beta$-bis(trifluoromethyl)stilbene.

5. The compound of claim 1 wherein X = H and Y =

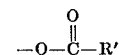

wherein R' is $CH_3$, p-acetoxy-$\alpha,\beta$-bis(trifluoromethyl)stilbene.

6. The compound of claim 1 wherein X = Y =

wherein R' is $C_2H_5$, p,p'-dipropionoxy-$\alpha,\beta$-bis(trifluoromethyl)stilbene.

7. The compound of claim 1 wherein X = Y =

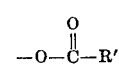

wherein R' is $C_6H_5$, p,p'-dihydroxy-$\alpha,\beta$-bis(trifluoromethyl)stilbene dibenzoate.

* * * * *